Dec. 31, 1963  G. DURST  3,115,808
SUCTION PLATE FOR PHOTOGRAPHIC AND GRAPHIC WORK
Filed Sept. 12, 1960  2 Sheets-Sheet 1
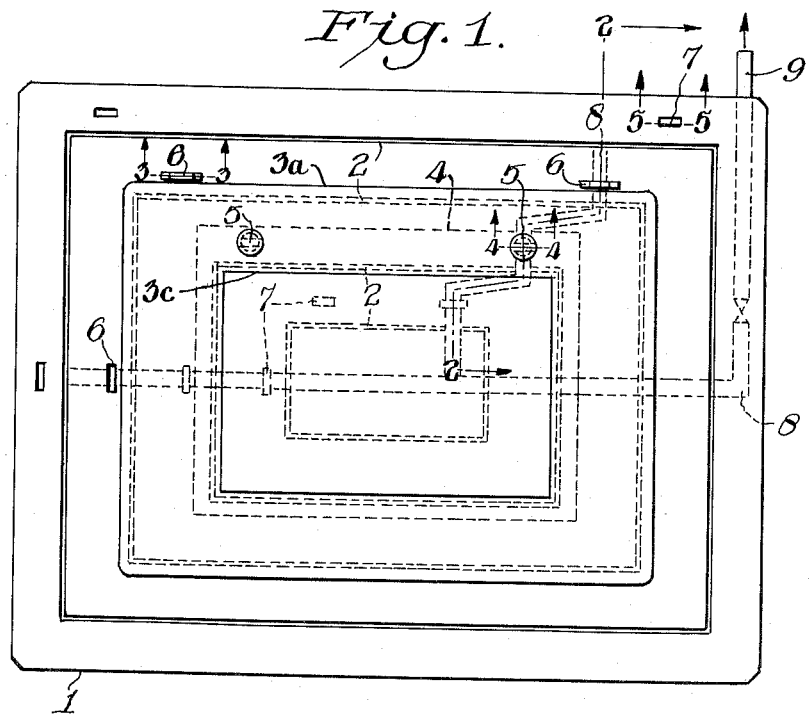
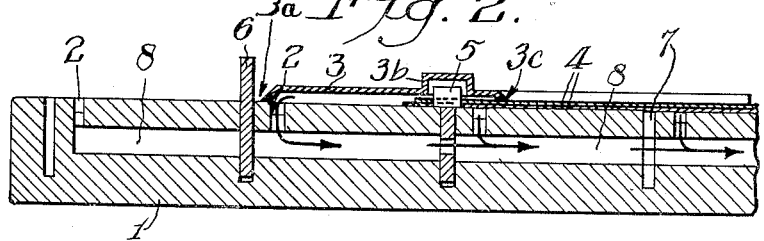
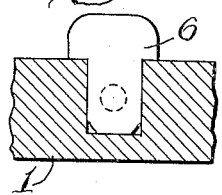 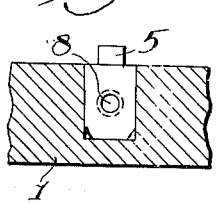 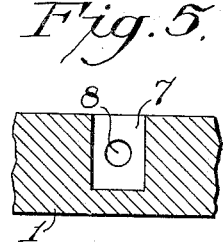
INVENTOR
Gilbert Durst
BY Connolly and Hutz
ATTORNEY Dec. 31, 1963 G. DURST 3,115,808
SUCTION PLATE FOR PHOTOGRAPHIC AND GRAPHIC WORK
Filed Sept. 12, 1960 2 Sheets-Sheet 2
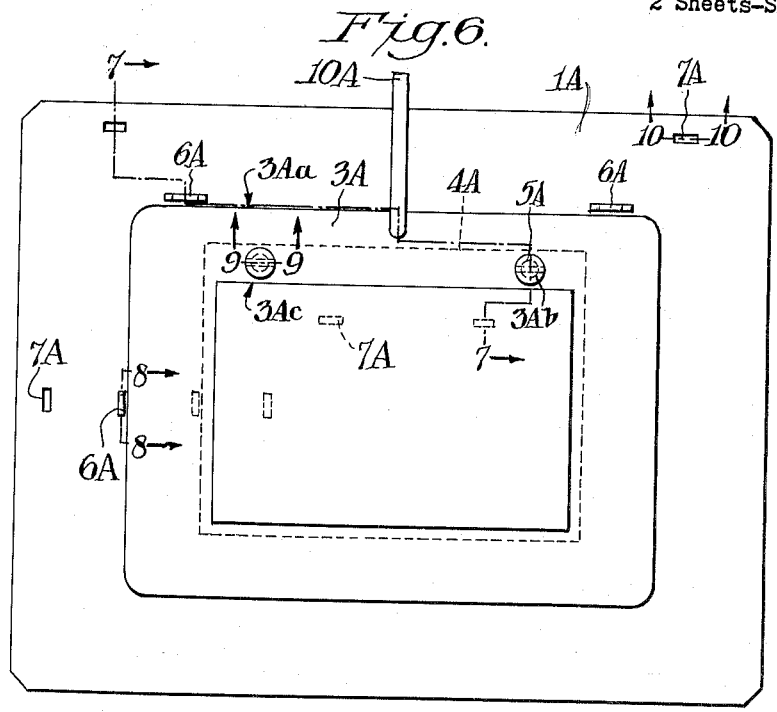
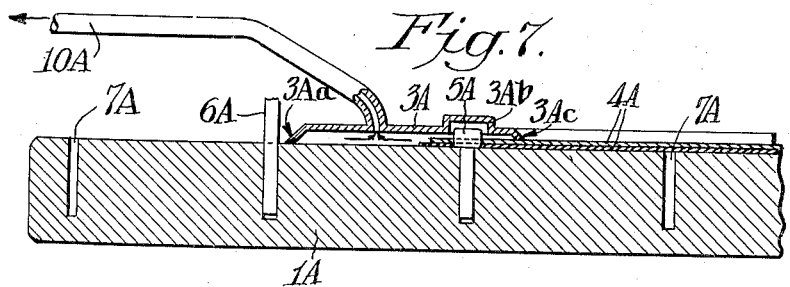
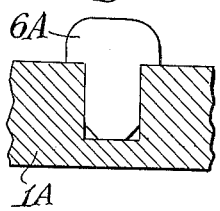 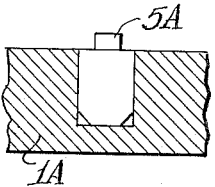 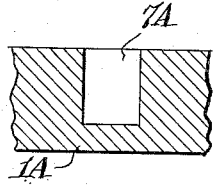
INVENTOR
Gilbert Durst
BY Connolly and Hutz
ATTORNEY

United States Patent Office 3,115,808
Patented Dec. 31, 1963

3,115,808
SUCTION PLATE FOR PHOTOGRAPHIC AND GRAPHIC WORK
Gilbert Durst, Bressanone, Italy, assignor to Durst S.p.A. Fabrica Macchine ed Apparecchi Fototecnici, Bolzano, Italy
Filed Sept. 12, 1960, Ser. No. 55,264
Claims priority, application Italy Apr. 28, 1960
9 Claims. (Cl. 88—24)

This invention relates to a pneumatic suction device for holding sheets of material flat and motionless, and it more particularly relates to such a device for photographic and graphic purposes.

Suction devices by which light-sensitive films as well as photoengraving sheets are securely held upon a flat plate by suction have been used for some time. A novel form of such device in which the outlining of the suction area and application of suction are automatically coordinated is described in co-pending application for United States Letters Patent by this same inventor, entitled Pneumatic Suction Plate, S.N. 31,614, filed May 25, 1960, and now Patent No. 3,064,524. The type of suction device described therein works remarkably well for holding single sheets of material. However, when it must be used for holding several layers of sheets such as semi-transparent film, an auxiliary transparent cover foil or sheet must be used to hold the films under it flat. This transparent foil is made of a more or less transparent plastic material which is usually relatively soft and subject to surface marring, such as scratching. These surface imperfections as well as finger prints and any dust particles that may be deposited upon the cover foil are printed together with the information upon the film held under it. Furthermore, these cover foils inherently have undesirable light-absorbing and filtering characteristics.

An object of this invention is to provide a suction device for holding a multiplicity of sheets upon a flat surface which does not require the use of a foil which covers the entire surface of the sheets.

In accordance with this invention, several layers of sheets such as films are positioned upon a suction plate with reference to a guide means such as the tops of projecting rods. A masking frame is placed upon the films with its inner border covering the periphery of the upper sheet and its outer border contacting the surface of the plate. A suction conduit is connected to the space between the frame and the plate for exhausting air from it to cause the inner border of the frame to be forcefully pressed down upon the sheets for confining them securely to the surface. The major portion of the film being held accordingly remains uncovered within the inner border of the frame to permit only the subject matter upon the film being held to be printed.

Novel features and advantages of the present invention will become apparent to one skilled in the art from a reading of the following description in conjunction with the accompanying drawings wherein similar reference characters refer to similar parts and in which:

FIG. 1 is a plan view of one embodiment of this invention;

FIG. 2 is a cross-sectional view taken through FIG. 1 along the line 2—2;

FIG. 3 is a cross-sectional view taken through FIG. 1 along the line 3—3;

FIG. 4 is a cross-sectional view taken through FIG. 1 along the line 4—4, without the masking frame;

FIG. 5 is a cross-sectional view taken through FIG. 1 along the line 5—5;

FIG. 6 is a plan view of another embodiment of this invention; and

FIGS. 7–10 are cross-sectional views respectively taken through FIG. 6 along the lines 7—7, 8—8, 9—9 and 10—10.

In FIGS. 1–5 is shown a suction device 1 for holding sheets of material such as several layers of perforated film 4 flat and motionless without covering the major portion of them. Suction device 1 includes several grooves 2 of varying size cut into the surface of the plate in regular configurations such as rectangles of various sizes. The sizes of grooves 2 are slightly smaller than the standard sizes of sheets 4 of film or photoengraving type which are positioned selectively over one or more of grooves 2 as shown in hidden outline in FIG. 1. A single sheet 4 could be held by the suction applied under it if it were positioned over an imperforated centering rod 5 having no hole in it as illustrated by rod 6. A rod of this type as described in aforementioned copending application S.N. 31,614 filed May 25, 1960, would center a single sheet and maintain the suction confined to the area under the sheet. However, the embodiment shown herein is able to hold several layers of sheets 4 without covering them entirely by the use of a masking frame 3 having an outer border 3a which fits within the area of the plate and an inner border 3c smaller than one of sheets 4 but large enough to leave clear a substantial area of it. The portion of frame 3 between borders 3a and 3c is, for example, just large enough to cover a slot outside of one set of grooves and the groove just outside of this slot.

As also shown in FIG. 2, rod 5 is perforated to permit a limited suction to be drawn from the space under masking frame 3 covering groove 2 connected with this space. This causes the inner border 3c of the masking frame to be forcefully pressed down upon sheets 4 for confining them upon the flat surface.

The upper end of rod 5 is peg-shaped as shown in FIG. 1 to engage one of the perforations in the edges of films 4. Furthermore, the portion of masking frame 3 directly above rod 5 includes a cylindrical projection which engages the peg-shaped end of rod 5 to position the masking frame over the sheets 4 and next outer groove 2. The suction to the groove 2 beyond the one covered by masking frame 3 is cut off by imperforated rods 6 which extend into suction passageway 8. Slots 7 into which no rods are inserted permit unimpeded exhaustion of air past and through them within suction passageway 8. A connecting pipe 9 connects an external suction pump to device 1.

It is important that the borders or edges 3a and 3c of masking frame 3 form a tight fit with the upper layer of sheets 4 and the surface of suction plate or device 1. These edges may, therefore, be made of a soft material such as rubber or be edged with a rubber strip (not shown) to insure an air-tight fitting with the sheets and flat surface. Furthermore, edge 3a may extend downwardly a longer distance than edge 3c to permit edge 3a to accommodate the thickness of several sheets without raising the edge 3c out of position.

The direction of air flow through the device is shown by the arrows in FIGS. 1 and 2, and the hole in perforated rod 5 permits air to be exhausted from within the space under masking frame 3 as well as from under the lower sheet 4. Imperforated rods 6 also help center masking frame 3 as well as cutting off the suction from grooves 2 outside of rod 6.

In utilizing a device of this type, three imperforated rods 6 are inserted in the position shown in FIG. 1, and two perforated rods 5 are inserted into plate 1. Two perforated films 4 are then placed one over the other with their perforations engaged over the peg-shaped ends of rods 5. Then masking frame 3 is placed with its outer edge 3a adjacent the three heads of rod 6 and their projections 3b engaged over the heads of perforated rods 5.

The suction provided to the space under masking frame 3 through groove 2, which is connected with this space, causes the edge 3c to forcefully press down upon the sheets for confining them to the flat surface. This suction also seals the outer edge 3a against the flat surface of plate 1 to provide a seal.

In FIGS. 6–10 is shown another embodiment of this invention in which suction plate 1A has no suction passageway but only incorporates slots 7A for accommodating positioning rods 5A and 6A. Masking frame 3A is applied over sheets 4A in the same manner described in FIGS. 1 and 2 by fitting inside of rods 6A and over peg-shaped heads of rods 5A. However, suction is applied under suction masking frame 3A by a conduit 10A attached to an upper surface of masking frame 3A for connecting it to a source of suction (not shown). This conduit 10A is made for example of a resilient material which may be fairly stiff such as stiff rubber or even a metal conduit to permit it to serve as a hinge about which masking frame 3A may be moved toward and away from suction plate 1A. The exhaustion of air from under frame 3A presses films 4A down against plate 1A in the same manner described relative to FIGS. 1 and 2. However, the connection of the suction conduit directly to 3A avoids the necessity of providing any suction passageway within the plate.

What is claimed is:

1. A suction device for holding sheets of material flat and motionless comprising a flat-surfaced plate, a masking frame having an outer border which fits within the area of said plate and an inner border smaller than one of said sheets but large enough to leave clear a substantial area of it, guide means upon said plate for positioning said masking frame and said sheet upon said plate with the inner border of said frame contacting the top of said sheet, the inner and outer borders of said masking frame fitting respectively closely to said sheet and plate and spacing the portion of said masking frame between said borders away from said plate to provide a space therebetween, a suction conduit connected to said space for exhausting air from it to cause said inner and outer borders of said masking frame to be respectively forcefully pressed down upon said sheet and said plate for confining said sheet upon said flat surface, said plate including a suction passageway extending outwardly within said plate under said surface from the central surface of said area, said surface including a groove which communicates with said space under said masking frame, a channel connecting said groove with said passageway to provide said suction conduit, a series of said grooves of varying size being provided, sets of slots intersecting said suction passageway and extending through said surface of said plate at positions slightly outside of each of said grooves, said frame covering an outer one of said grooves, rods being inserted through the slots inwardly of said outer one of said grooves, said rods being perforated to permit suction to be drawn through them from said groove under said masking frame, and said perforated rods extending above said surface to provide means for positioning said sheet and said masking frame upon said plates.

2. A suction device as set forth in claim 1 wherein said sheets include perforations through which the extensions of said perforated rods are inserted, and a portion of said masking frame includes upwardly extending projections which fit about the tops of said perforated rods for positioning said masking frame over said sheets.

3. A suction device as set forth in claim 1 wherein the edges of said masking frame extend downwardly from it, and said edges being constructed and arranged to fit tightly with said sheet and said plate respectively.

4. A suction device as set forth in claim 3 wherein the outer edge of said masking frame extends a longer distance downwardly than its inner edge to accommodate the thickness of layers of sheets being held down by said central edge.

5. A suction device particularly useful for holding several layers of sheets comprising a plate having a flat surface, a suction passageway extending outwardly within said plate under said surface from a central area of said plate, said surface including a series of grooves of varying size for applying suction to sheets disposed upon said plate, sets of slots intersecting said suction passageway and extending through said surface into said plate at positions slightly outside of each of said grooves, perforated rods long enough to project above the surface of said device which are engageable with a set of said slots disposed outside one of said grooves for simultaneously controlling the suction applied to grooves outside of said slots within which said rods are inserted and providing a guide for positioning sheets over the suction area provided by grooves which are centrally disposed with respect to said slots into which said rods are inserted, said perforated rods being engaged with a set of said slots within said outermost set of slots to provide a means for positioning said layers of sheets over said grooves within said engaged slots, a masking frame covering the outer edge of said layers of sheets and the groove outside of said perforated rods and having a space under it, the inner and outer borders of said masking frame fitting closely to the upper sheet of said layers and said surface, and the perforations in said rods permitting air to be exhausted from said space through said covered groove for causing the inner border of said frame to be forcefully pressed down upon said sheets for helping confine them upon said flat surface.

6. A suction device as set forth in claim 5 wherein said masking frame includes projections which fit closely over the upper ends of said perforated rods for positioning said masking frame over said sheets.

7. A suction device as set forth in claim 6 wherein imperforated rods are inserted within any slots inwardly of grooves remaining outside of said masking frame for cutting off suction to said remaining grooves.

8. A suction device as set forth in claim 6 wherein said layers of sheets are films having perforations along their border, and said upper ends of said perforated rods being shaped to engage said perforations on said films.

9. A suction device for holding sheets of material flat and motionless comprising a flat-surfaced plate, a masking frame having an outer border which fits within the area of said plate and an inner border smaller than one of said sheets but large enough to leave clear a substantial area of it, guide means upon said plate for positioning said masking frame and said sheet upon said plate with the inner border of said frame contacting the top of said sheet, the inner and outer borders of said masking frame fitting respectively closely to said sheet and plate and spacing the portion of said masking frame between said borders away from said plate to provide a space therebetween, a suction conduit connected to said space for exhausting air from it to cause said inner and outer borders of said masking frame to be respectively forcefully pressed down upon said sheet and said plate for confining said sheet upon said flat surface, said guide means being provided by removable rods inserted into slots positioned at various positions upon said plate which define smaller and larger areas, upwardly extending projections being provided upon said masking frame for engaging said rods which also provide means for positioning said sheets, said suction conduit being connected to a portion of said masking frame for exhausting air pressure from under it, said suction conduit being made in a yieldable form to permit said frame to be moved toward and away from said plate, and said suction conduit being made stiff enough to provide a hinge about which said masking frame is moved toward and away from said plate.

References Cited in the file of this patent

UNITED STATES PATENTS 2,174,882     Huebner  ---------------- Oct. 3, 1939
2,895,706     Blatherwick  ------------ July 21, 1959